United States Patent [19]

Nahm et al.

[11] Patent Number: 5,382,290
[45] Date of Patent: Jan. 17, 1995

[54] CONVERSION OF OIL-BASE MUD TO OIL MUD-CEMENT

[75] Inventors: James J. W. Nahm; Reece E. Wyant, both of Houston, Tex.

[73] Assignee: Shell Oil Company, Houston, Tex.

[21] Appl. No.: 210,637

[22] Filed: Apr. 17, 1995

Related U.S. Application Data

[60] Continuation of Ser. No. 33,404, Mar. 19, 1993, abandoned, which is a division of Ser. No. 961,217, Oct. 15, 1992, Pat. No. 5,213,160, which is a continuation of Ser. No. 691,904, Apr. 26, 1991, abandoned.

[51] Int. Cl.$^6$ ............................................. C04B 7/14
[52] U.S. Cl. .................................... 106/789; 106/790; 106/819; 106/822; 106/823
[58] Field of Search ............... 106/713, 714, 719, 721, 106/739, 744, 789, 790, 791, 792, 793, 794, 795, DIG. 2, 823, 675, 822, 819

[56] References Cited

U.S. PATENT DOCUMENTS

| | | |
|---|---|---|
| 2,649,160 | 8/1953 | William et al. . |
| 2,705,050 | 3/1955 | Davis et al. . |
| 2,776,112 | 1/1957 | Ilfrey et al. . |
| 2,776,713 | 1/1993 | Morgan et al. . |
| 2,806,530 | 9/1957 | Binkley . |
| 2,806,531 | 9/1957 | Morgan et al. . |
| 2,890,169 | 6/1959 | Prokop . |
| 3,022,824 | 2/1962 | Binkley et al. . |
| 3,145,774 | 8/1964 | Patchen . |
| 3,168,139 | 2/1965 | Kennedy et al. . |
| 3,409,093 | 11/1968 | Cunningham et al. . |
| 3,499,491 | 3/1970 | Wyant et al. . |
| 3,605,898 | 9/1971 | Harrison et al. . |
| 4,083,407 | 4/1978 | Griffin, Jr. et al. . |
| 4,176,720 | 12/1979 | Wilson . |
| 4,519,452 | 5/1985 | Tsao et al. . |
| 4,548,270 | 10/1985 | Eilers . |
| 4,676,832 | 6/1987 | Childs et al. . |
| 4,883,125 | 11/1989 | Wilson et al. . |
| 4,935,060 | 6/1990 | Dingsoyr ........................... 106/719 |
| 4,997,487 | 3/1991 | Vinson et al. . |
| 5,005,646 | 4/1991 | Bloys et al. . |
| 5,007,480 | 4/1991 | Anderssen ......................... 106/292 |
| 5,058,679 | 10/1991 | Hale et al. . |
| 5,226,961 | 7/1993 | Nahm et al. ........................ 106/692 |

FOREIGN PATENT DOCUMENTS 747213 11/1966 Canada .

*Primary Examiner*—Mark L. Bell
*Assistant Examiner*—Paul Marcantoni

[57] ABSTRACT

A water-in-oil emulsion drilling fluid can be converted into an oil mud-cement slurry for use in oil well cementing procedures. Also, a universal fluid can be prepared using the water-in-oil emulsion drilling fluid by treating with an hydraulic material so that it will lay down a filter cake during drilling which can be triggered to set into a hard cement and bond to the formation after the above oil mud-cement slurry has been placed in the borehole at the conclusion of drilling.

7 Claims, No Drawings

CONVERSION OF OIL-BASE MUD TO OIL MUD-CEMENT

This is a continuation of application Ser. No. 08/033,404, filed Mar. 19, 1993, which is a division of application Ser. No. 961,217 filed Oct. 15, 1992, which is a continuation of application Ser. No. 691,904 filed Apr. 26, 1991, now abandoned.

BACKGROUND OF THE INVENTION

1. Field of the Invention

The present invention pertains to improvements in compositions and methods for zonal isolation for vertical, deviated, and horizontal oil and gas wells. The method involves the utilization of oil-base universal fluid for providing settable filter cake while drilling and the subsequent in-situ solidification of the drilling mud or both the drilling mud and universal fluid filter cake to compressive strengths well in excess of that required for casing support, zonal isolation, and borehole stability.

2. Description of Prior Art

The general procedure of drilling an oil or gas well includes drilling a borehole using a drilling fluid (also termed drilling mud). Subsequent to drilling the borehole, casing is run into the well and a cement slurry is then placed in the annulus between the outside of the casing and the borehole wall. In order to obtain a good cementing job, it is necessary for the cement slurry to displace substantially all of the drilling mud from the annulus. A reduced displacement efficiency arises from the geometry of the system and also from the fact that drilling fluids and cements are usually incompatible.

Nondisplaced mud (mud still left in the borehole after cementing) and mud filter cake are major causes of unsatisfactory cement performance. Since the nondisplaced mud and mud filter cake do not set or bond to the casing, the borehole wall or the set cement itself, the mud and filter cake do not support the casing properly and later can allow annular gas or fluid migration.

Wells frequently are drilled with oil-base muds which contain water as the internal emulsified phase. These oil-base muds are used, for example, to lower drilling torque and drag, reduce damage to productive formations, increase wellbore stability or reduce differential pressure pipe sticking, etc. The presence of oil mud in the wellbore can even further reduce the displacement efficiency while cementing with a conventional water-base cement slurry.

The drilling industry has sought to overcome the above problems by using a variety of techniques to displace the drilling fluid with cement, e.g., turbulent flow, casing movement (reciprocation/rotation), casing equipment (centralizers, flow diverters, mud cake scratchers), and special spacers and wash fluids, but these have had limited success. Even greater cementing difficulties are encountered when the boreholes deviate greatly from vertical. Major problems arise in connection with casing placement, drilled solids settling, mud displacement, casing centralization, fluid separation (free water), and mechanical friction. When a good cementing job is not obtained, it may be necessary to perforate the casing and squeeze cement under high pressure through the perforations into the annulus and try to fill the zones that were not properly cemented initially. Frequently, this squeeze cementing is not successful, and such failures may eventually lead to abandoning the hole.

One of the major objectives of a primary cementing is to obtain good zonal isolation in the annulus of the well. Effective zonal isolation is achieved by sealing the cement and borehole wall. The interface of the cement and borehole wall is usually an interface between the cement and drilling fluid filter cake which is the source of many cementing problems. Good zonal isolation can be achieved if the filter cake hardens, permanently bonds to the formation face and the cement, and provides hydraulic sealing.

Accordingly, the present invention is directed to overcoming the above-noted problems in the art and to providing a solution as more particularly described hereinafter.

SUMMARY OF THE INVENTION

The primary purpose of the present invention is to provide compositions and methods for in-situ solidification of oil-base drilling muds and for forming oil-base universal fluid filter cakes which can be solidified.

Hereinafter, the term "cement" is used in reference to Portland cement or other available hydraulic materials. Most of the exemplification herein is based on using Portland cements. The type of oil in the oil-base mud is usually not critical to the cementing process in the present context. If necessary, a satisfactory oil mud cement slurry could be made from pure oil by adding sufficient amounts of cement, water, emulsifiers, fluid loss additives, suspending agents, accelerators, etc.

Drilling muds are used for the present in-situ conversion process for many reasons. The oil-base mud is already present at the well site in the large quantities necessary for cementing the well. All (or most) of the emulsifying, stabilizing, and fluid loss control materials, and a major portion of the mechanical shearing necessary to produce a good emulsion already have been incorporated into the mud to be converted to an oil mud cement slurry. It is much easier, less expensive, and less time consuming to make adjustments to a preexisting invert emulsion mud (oil-base mud) than to build one from scratch.

In addition, drilling mud left after the drilling of a well must be disposed. Oil-base muds are even more of an environmental problem than are water-base muds. If a large portion of the leftover drilling mud is used to cement the well, the total disposal expense can be substantially reduced.

A satisfactory oil mud cement slurry must have a sufficiently high ratio of total solids-to-oil so that the solids particles will be closely spaced, and growing cement hydrate crystals can link to each other and adjacent solids particles to give a strong, unified, cohesive structure without the separation of oil from the solid mass. The total solids (cement plus the solids already in the mud)-to-oil volume ratio can vary from about 1.4 to 2.2.

Sufficient water must be present in the slurry to allow for hydration of the dry cement particles. Extra water is normally added even to the slurries prepared from high water content oil-base muds. This is to provide hydration water for the total cement added to satisfy the desired solids-to-oil ratio. Thus, the present slurry design is a two-step process: first, enough cement, and second, enough water.

Drilling muds having a low oil-to-water ratio (high water) are preferred (but not necessary) according to the following reasoning. High water means lower oil content, so less cement is required to provide the correct solids-to-oil ratio. This lowered cement content then requires less additional water for hydration. If a stable high-water oil-base mud is used, additional emulsifiers probably will not be required. Low-water oil-base muds usually require additional emulsifiers and stabilizers to produce a good oil mud cement. Thus lower added volumes and costs are required for each barrel of the excess high-water drilling mud used. Also more barrels of the drilling mud are used to produce the required fluid volume of oil mud cement and the ultimate disposal costs are reduced.

In conjunction with the method and composition for the solidification of an oil-base drilling mud, the present invention includes a composition and method for drilling with an oil base universal fluid and for providing a filter cake (formed as a permeable formation is drilled with an oil-base mud) which can be solidified to form a cementitious structure intimately bound to the formation itself.

Accordingly, the present invention provides a method for cementing a well comprising admixing an oil mud with (a) sufficient hydraulic material and water to form a slurry having a total solids-to-oil volume ratio of about 1.4 to 2.2 and a water-to-hydraulic material weight ratio of about 0.15 to 0.60, and (b) sufficient accelerator or retarder to cause the oil mud cement to harden and set up at a preselected time; and displacing the slurry to a preselected location in the well, and allowing the oil mud cement to harden and set up.

The present invention also provides a composition for cementing a well comprising an oil mud containing sufficient hydraulic material and water to form a slurry having (a) a total solids-to-oil volume ratio of about 1.4 to 2.2 and a water-to-hydraulic material weight ratio of about 0.15 to 0.60, and (b) sufficient accelerator or retarder to cause the oil mud-cement to harden and set up at a preselected time.

Other purposes, distinctions over the art, advantages and features of the invention will be apparent to one skilled in tile art upon review of the following.

DESCRIPTION OF PREFERRED EMBODIMENTS

The following preferred embodiments of the invention, together with the following examples, explain the principles of the invention.

In accordance with the present invention, it has been discovered that high water oil-base muds, with an alkali metal halide (preferably sodium chloride) internal phase, are particularly suitable for forming oil mud cements. Although calcium chloride brine muds usually are preferred in field drilling operations, it has been found that it is generally not satisfactory to use calcium chloride in the formation of an oil mud cement. Also, although not preferred, conventional invert oil muds, e.g., having an oil-to-water volume ratio of 95:5 to 70:30, also can be used for in-situ mud conversion, although additional emulsifiers and stabilizers may be required. By the term "high water" it is intended to mean an oil-to-water volume ratio of approximately 30:70 to 70:30, with a ratio of about 50:50 being optimal. The high water oil-base muds must be formulated to have high emulsion stability with large amounts of water under high temperature drilling conditions. Such muds must tolerate the high water content and maintain reasonable rheological properties comparable to those of regular invert oil muds. A highly contamination-resistant mud is desired because a large quantity of cement and extra water are added to the mud system in order to convert the mud into a high-compression strength mud concrete. The addition of any necessary emulsifiers, stabilizers or wetting agents adds to the cost of the system.

One barrel of a representative 13.5 lb/gal mud suitable for use in the invention has a composition as follows: diesel oil, 0.42 barrels; lime, 2.4 pounds; "CARBO-TEC L" (primary emulsifier, tall oil fatty acids, by Milpark Drilling Fluids), 1 gallon (8.1 pounds) water, 0.42 barrels; sodium chloride, 49 pounds; "CARBOMUL" (secondary emulsifier, tall oil polyamide, by Milpark), 1 gallon (7.7 pounds) "SURFCOTE" (wetting agent, amine dodecyl benzene sulfonate, by Milpark), 2.0 pounds; barite, 312 pounds. While the preceding mud formulation is with diesel oil, it is to be understood that other oils or hydrocarbons may be employed. The use of diesel oil-based muds is restricted in many parts of the world because of environmental concerns. Non-toxic, mineral or "clean" oil muds offer the benefits of an oil-base mud while maintaining a toxicity near that of water-base muds. Currently, non-toxic mineral oils such as Exxon's "ESCAID 110" (1.6 csf @ 40° C.), Conoco's "LVT 200", Vista's "ODC", and Shell's "SOL DMA" are available. These oils are considerably thinner than diesel oil (3.7 csf @ 40° C.), but can be used satisfactorily for making low toxicity oil-base muds.

As above mentioned, it is highly preferred to use a sodium chloride salt with the oil mud of the present invention. Calcium chloride brine muds are very difficult to use, giving many thickening, emulsion-breaking, and fluid separation problems even while mixing. The calcium chloride slurries become very thick during mixing and never attain a satisfactory set strength for use herein. Thus, although calcium chloride brine muds usually are preferred in field drilling operations, they are not desirable for making the oil mud cements. Other less preferred salts which may be suitable for use with the invention include potassium chloride, zinc chloride, sodium nitrate, and ammonium sulfate.

As also above mentioned, the present invention utilizes an oil base mud to which is added cement and extra water if desired for additional cement hydration. The dry cement particles are coated with the oil phase and the extra water is dispersed as the internal emulsified phase (adding to the emulsified water already present in the mud).

The water becomes available to the cement for hydration by an osmosis-like process across a semi-permeable membrane of oil and surfactants between the water droplets and the cement particles. An osmotic pressure causes water molecules to migrate across the semi-permeable membrane from the high vapor pressure (wet) water droplets to the low vapor pressure (dry) cement particles. Water molecules arriving at the cement combine with the "water thirsty" cement particles to form calcium silicate hydrate crystals. The calcium silicate hydrate crystals grow and extend through the surrounding oil phase, link together, and form a competent set cement structure. As long as the vapor pressure of the cement particles remains low, the osmosis of water occurring in the cement hydration reactions will continue. The majority of water present in the mud is consumed by the cement hydration reactions, and the emulsion droplets are used up as the oil mud cement sets. The water-internal emulsion does not break during setting. The oil remains evenly dispersed in the set mass, and no water or oil separates from the set oil mud cement. Any separated fluids would produce undesirable channels in the set oil mud cement.

The hydration reactions are accelerated by increased temperature, which increases the chemical potential (vapor pressure driving force), and by high mechanical shear during preparation and well operations. This mechanical energy helps to generate a large number of small water droplets which lie closer to the cement particles. The cement accelerators increase the rate of early strength development by decreasing the dormant or induction period in the hydration of portland cement.

While various waters may be used with the present invention, such as fresh water, brackish water, brine, seawater or other water-containing fluids, for ease of control it is preferred that fresh water added to allow full hydration of the cement be used. Waters other than fresh might have various materials (e.g., salts, lignins or tannins) present which could affect the cement hydration rates.

Not only is the type of water employed significant, but it is also considered important that the correct amount of water be utilized. A large amount of cement is added to the drilling mud to make a slurry that can attain the desired set strength. Water is necessary for the cement hydration which produces the set strength. If enough water is not already present in the stable oil-base mud, it must be added. A water-to-cement weight ratio of about 0.15 to 0.60 is preferred and optimally about 0.30 to 0.35. If a high-water oil-base mud is used, the mud has already been conditioned to withstand a high water content and it will probably remain stable when the cement and extra water (if necessary) is added without requiring treatment with expensive emulsifiers, stabilizers or wetting agents. Thus the oil-base mud with an oil-to-water volume ratio of 30:70 to 70:30 has been specified with a practical optimum of about 50:50. Water in excess of the amount needed to hydrate the cement will increase the viscosity (as water is the internal phase), reduce the slurry density, and remain unreacted in the set oil mud-cement mass, thus reducing compressive strength and increasing porosity and permeability. Theoretically, the water required for complete cement hydration is about 25% of the weight of cement. In normal practice oil well cementing, water-to-cement values of 35% to 45% by weight are used to provide sufficient fluidity and density control. Hereinafter, a water-to-cement value of 35% by weight usually has been used to be sure that complete cement hydration takes place.

Another significant variable of the present invention is the amount of solids in tile oil mud-cement slurry. A solids-to-oil ratio by volume of 1.4 to 2.2, and optimally 1.80 is preferred. Any oil in excess of the amount needed to coat all of the added cement particles and to provide sufficient fluidity for mixing and pumping will remain as an inert diluent in the set oil mud cement mass, reducing the compressive strength and giving increased porosity and permeability. By using a constant volume ratio of the total solids (mud solids plus cement)-to-oil, a nearly comparable fluidity is attainable using any oil mud. The amount of oil is fixed in a given base mud and no extra oil is required. A solids-to-oil volume ratio of 1.8 appears to be optimum. From this solids-to-oil volume ratio value, the amount of cement needed is determined. Then, based on a chosen water-to-cement ratio, the amount of supplemental water is calculated.

Another important variable in the present invention is the cement material which is employed. In accordance with the present invention it has been found that Portland cement is economical, is widely available as a finely ground powder, and usually is very suitable for use. Other hydraulic materials such as fly ash, natural pozzolan, trass, tuff, and blast furnace slag may be usable for these purposes. None of these latter agents, however, performs as well as Portland cement which is preferred. Among the Portland cements, Class C or A cement gives higher strength than does Class G or H, and accordingly, Class C or A is generally preferred.

It has been found that oil mud-cements set harder and more rapidly at 180° F. than at 150° F. Thus, to the extent that temperature is controllable, it is possible to control the setting rate of the oil mud-cement. Normally, the control of temperature in a well is not within the scope of the operator, at least to any significant degree.

Essentially, oil mud-cements preferably are prepared by adding a Portland cement to an oil-base mud. An emulsified internal water phase is necessary to allow hydration of the cement. Supplemental water may be emulsified in the system to provide more hydration. The cement disperses in the oil phase and remains out of contact with tile water under normal conditions of mixing and storage. With time and/or higher temperatures, the water becomes available in the cement, and the cement hydration reaction proceeds, giving a solid set mass.

The slurry viscosity, the setting time, and the set strength of the slurries of the present invention can be adjusted using appropriate oil-wetting agents, emulsifiers, and accelerators, as well as controlling temperature. The mechanism by which the setting occurs is not fully understood, but with increased temperature, the rate of setting is greatly increased. Initially, the mud should be able to accept addition of the cement and extra water while maintaining stable properties, so that the resulting slurry can be mixed and pumped into a wellbore. With time at elevated temperatures, the water molecules apparently migrate through the oil phase to the cement particles by an osmosis-like process. The cement then slowly hydrates, and the calcium silica hydrate crystals grow through the oil phase to link and form a solid structure. The oil and any unreacted water remain evenly dispersed in the set cement. Too little water will not produce sufficient hydration to give strength, while too much water unnecessarily increases the porosity and permeability and reduces the strength. Any oil present in excess of that required to coat all of the solid materials and to provide sufficient fluidity remains in the solidified mass, increasing the porosity and permeability and reducing the ultimate strength. Properly prepared oil mud-cements have very low air permeabilities.

Another significant variable of the invention is the additives employed in the system. These various additions, used in effective amounts, can provide set acceleration, retardation, or viscosity control as well as additional emulsification or oil wetting properties if needed for the incorporation of tile cement or extra water.

Set accelerators are desirable to provide sufficient set strength within a reasonable time. "POZZUTEC-20" (a proprietary commercial low temperature accelerator of mixed organic and inorganic salts made by Master Builders for the construction industry) is an effective accelerator. By itself, FAM (an acronym for a mixture of 45% by volume formic acid, 45% by volume acetic acid, and 10% by volume methanol) is not as effective as Pozzutec-20 but it seems to work very well in combination with the Pozzutec-20. Formic acid and acetic acid separately give some acceleration but appear to work more effectively in combination and with methanol. MSF (magnesium silicofluoride) and ZSF (zinc silicofluoride) appear to be about equivalent but not as effective as either FAM or Pozzutec-20. "SURF-COTE" (a Milpark oil wetting agent believed to contain dodecyl benzeneaminesulfonate) is the only agent found to have a thinning effect on the oil mud cement other than the thinning effect afforded by mere oil dilution. However, SurfCote is also a strong set retarder.

To help stabilize the high water content of the oil mud cements, inclusion of additional emulsifiers may be required. Milpark's primary emulsifier "CARBO-TEK L" (primarily a modified tall oil fatty acid), their secondary emulsifier "CARBO-MUL" (known as tall oil polyamide), and their "CARBO-DRILL" (composition undisclosed), an experimental emulsifier for high water content oil muds, have been useful for this purpose.

The above-mentioned emulsifying and stabilizing agents are used to give the oil mud-cement stability for whatever conditions are necessary. It is preferred, however, not to overtreat the oil mud-cement system since such agents are expensive and frequently are strong set retarders. Any over-retardation then requires additional accelerators to give a set within the desired time. For example, three similar oil-base muds (designated Na-1, Na-2, and Na-3 ) were mixed in the laboratory. Na-1 had moderate amounts of the emulsifiers and stabilizers; Na-2, excessive amounts Na-3, minimal amounts. Oil mud-cement slurries of each, made by adding the same calculated ratios of cement-to-solids and water-to-cement, were then placed in a 180° F. oven to cure. Oil mud-cement prepared from Na-1 became hard in five days oil mud-cement prepared from Na-2 did not become hard even by 36 days and oil mud-cement prepared from Na-3 became hard by one day. The addition of 7.5 lb/bbl of Pozzutec-20 made both oil mud-cements made from Na-1 and Na-2 also become hard in one day.

EXAMPLES

Laboratory Test Procedures

Screening tests were conducted in small glass vials. A base oil mud-cement slurry was made by adding cement, extra water, and any additives to the oil muds using normal lab mixers and Hamilton-Beach high-speed mixers. Equal portions (20 ml) of this base slurry were then measured into small glass vials (32 ml) for test series.

The samples were sealed in the vials and heat aged statically for hardening. The large majority of the samples were aged at either 150° F. or 180° F. The setting of the oil mud-cement (OMC) samples were monitored with time using a spatula "hardness" test in the vials. The hardness scale ranged from 0 to 10, with 0 being completely fluid and 10 being "rock hard." A hardness of 9 corresponds to a compressive strength of approximately 150 psi. Samples with hardness greater than 9 were retested using a Brinell tester to estimate equivalent compressive strengths measured in psi. All laboratory testing used Milpark's 13.5 lb/gal CarboDrill-HW oil mud (oil-to-water ratio of 50:50) with a 25 percent sodium chloride brine as the internal phase. The water added to allow full hydration of the cement was fresh water rather than brine.

Table A shows the effects of changing the solids-to-oil ratio studied in the absence of accelerators using a base mud system, Na-2. The amount of Class A cement needed to give the same solids-to-oil ratio varies with mud composition. Higher solids-to-oil ratios seem to produce slightly higher compressive strength.

TABLE A

Solidification of Various 14 lb/gal CarboDrill-HW Muds Without Adding Any Accelerator: Effect of Maintaining a Constant Water-to-Cement Ratio and Varying Total Solids-to-Oil Ratio (SOR) on Compressive Strength of Samples Cured Static at 180° F.

| Slurry | Mud Type | SOR | Class A Cement (lb/bbl) | Water (lb/bbl) | Hardness w/Time (in days) | Compressive Strength (psi) (GHN) |
|---|---|---|---|---|---|---|
| OMC 358 | Na-2 | 1.85 | 617.5 | 129.5 | 3.5 (24), 3.8 (36) | ns |
| OMC 359 | Na-2 | 2.0 | 688.0 | 157.5 | 3.7 (9), 3.7 (28), 4.4 (36) | ns |

Notes:
SOR, cement and mud solids-to-oil ratio.
40% bwoc (by weight of cement) water (initial and added) used in all cases.
*ns = not set The samples prepared using the Na-2 mud were strongly retarded and did not set. The Na-2 mud contained both SurfCote, a powerful oil wetting agent, and CarboDrill, an experimental emulsifier of undisclosed chemical composition.

The two slurries (OMC 358 and 359) shown in Table A were used as base slurries to study the effectiveness of several accelerators. The setting of base slurries OMC 358 and 359 using the highly retarded Na-2 mud was accomplished only by adding 7.5 lb/bbl Pozzutec 20.

A series of tests screening candidate accelerators was conducted at 150° F. and 180° F. The hardness test results are listed in Table B. API Class A cement at 600 lb/bbl levels was added to specially formulated high-water oil emulsion muds, Na-2, along with several accelerators and setting agents. Accelerators are added to the OMC slurries to speed the reactions and to attain a higher set strength within a reasonable time. They were Pozzutec 20 (PT-20), magnesium silicofluoride (MSF), and zinc silicofluoride (ZSF). Pozzutec 20 is a low temperature accelerator from Master Builders used in the construction industry.

Table B shows that (1) a temperature increase from 150° F. to 180° F. increases the compressive strength, (2) a PT-20 (Pozzutec 20) concentration of 7.5 lb/bbl seems to be about optimum, and (3) MSF and ZSF appear to be about equivalent, but Pozzutec 20, at a concentration of 7.5 lb/gal appears to be superior to either of them.

TABLE B

Effect of Temperature and Accelerator on Compressive Strength of Set 14 lb/gal CarboDrill Na-2 Mud

| Slurry | Accelerator (lb/bbl) | Hardness/ Compressive Strength (BHN) Aged at 150° F. | Hardness/ Compressive Strength (BHN) Aged at 180° F. |
|---|---|---|---|
| Base | — | 3.51— | — |
| OMC 1 | MSF, 6 | 9.5/— | 10/570 |
| OMC 2 | MSF, 9 | 9.7/250 | 9.8/410 |
| OMC 2a | ZSF, 9 | 9.9/440 | 10/280 |
| OMC 3 | ZSF, 9 | 9.7/410 | 9.9/850 |
| OMC 4 | PT-20, 5.5 | 9.9/480 | 10/840 |
| OMC 5 | PT-20, 7.5 | 10/520 | 10/890 |
| OMC 6 | PT-20, 10 | 10/560 | 9.8/710 |
| OMC 7 | PT-20, 15 | 10/590 | 9.9/710 |

Notes:
Base oil mud-cement contains 600 lb/bbl Class A cement and 94.5 lb/bbl supplemental water
MSF, magnesium silicofluoride
PT-20 is Pozzutec 20 by Master Builders
ZSF is zinc silicofluoride Efforts were continued to improve the compressive strength by using combinations of additives. Table C shows that OMC 393 had a compressive strength of 1,300 psi. This was achieved by adding 7.5 lb/bbl Pozzutec 20 and 1.75 lb/bbl cyclohexanol in a Na-2 base mix which contains 600 lb/bbl Class A cement and 107 lb/bbl additional water. In this case, the cyclohexane doubled the strength of a comparable slurry, but in two other cases it slightly decreased the strength, and in the fourth case it completely prevented set. Although the role of cyclohexanol was not clear, it may have acted as a mutual solvent such that the cement hydration reactions were improved.

TABLE C

Evaluation of Accelerators and Other Additives in Na-2 Mud: Hardness and Compressive Strength of Samples Cured Static at 180° F., Base OMC Contains 600 lb/bbl Class A Cement and 93 lb/bbl Water

| Slurry | Accelerator/Additive (lb/bbl) | Hardness (days) | Compressive Strength (psi) (BHN) |
|---|---|---|---|
| OMC 248 | None | 3.0 (64) | n.s. |
| OMC 383 | PT-20, 7.5 | 9.9 (3) | 690 |
| OMC 384 | PT-20, 3.8 | 9.8 (3) | 750 |
| OMC 385 | PT-20, 7.5 | 9.9 (5) | 760 |
| OMC 386 | W, 13.3; PT-20, 7.5 | 9.9 (5) | 730 |
| OMC 387 | W, 26.6; PT-20, 7.5 | 9.9 (5) | 550 |
| OMC 391 | PT-20, 7.5; CH, 0.9 | 9.9 (4) | 750 |
| OMC 392 | PT-20, 7.5; CH, 1.8 | 9.9 (4) | 640 |
| OMC 393 | W, 13.3; PT-20, 7.5; CH 1.75 | 4.4 (4), 9.8 (11) | 1300 |

Notes:
CH, cyclohexanol
W, water
n.s., did not set or no strength

As shown in Table D, the effects varying amounts of extra water had on hardness and compressive strength were investigated in the Na-2 mud. The extra water varied from 0 to 209 lb/bbl, while Pozzutec 20 concentration was kept constant. OMC 411 gave a compressive strength of 1,057 psi with 93 lb/bbl of extra water. This strength peak was at a W/C ratio of 35 percent, rather than at the 25 percent ratio, which theoretically can give complete hydration.

TABLE D

Solidification of Na-2 Mud: Effect of External Water At 180° F.; Base Mix = Na-2 + 600 lb/bbl Class A Cement

| Slurry | Added Water (lb/bbl)* | Total Water (bwoc) | Additive/ Concentration (lb/bbl)** | Hardness/Curing Time (days) | BHN Compressive Strength (psi) |
|---|---|---|---|---|---|
| OMC 409 | 0 | 19.6% | PT-20, 13.9 | 6.0 (3), 8.5 (4), 9.7 (6) | 852 |
| OMC 410 | 70 | 31.3% | PT-20, 13.9 | 9.9 (3) | 925 |
| OMC 411 | 93 | 35.1% | PT-20, 13.9 | 10 (3) | 1057 |
| OMC 412 | 140 | 43.0% | PT-20, 13.9 | 9.9 (3) | 911 |
| OMC 413 | 209 | 54.4% | PT-20, 13.9 | 9.9 (3) | 727 |

*Concentration based on mud.
**Concentration based on base mix (mud + cement + water).
BHN is Brinell hardness number Table E lists the test results of Na-4 and Na-5 (conventional low water oil mud) muds. The Na-5 mud is a 14.3 lb/gal Milpark CarboDrill with an oil-to-water ratio of 87:13. The Na-5 mud is not a "high water" mud. First of all, the base mix 449 did not set. OMC 451 made from the Na-5 mud set hard and both contained 7.5 lb/bbl Pozzutec 20. The effect of FAM on set acceleration is not as good as that of Pozzutec 20.

TABLE E

Solidification of Na-5 Muds at 180° F.: Na-5 Mud-Milpark's 14.3 lb/gal CarboDrill (Oil-to-Water Ratio 87:13)

| Slurry | Base Mix | Additive/ Concentration (lb/bbl) | Hardness/Curing Time (days) | BHN Compressive Strength (psi) |
|---|---|---|---|---|
| OMC 449 | 449 | — | 3.7 (8) | — |
| OMC 451 | 449 | PT-20, 7.5 | 5.2 (1), 9.2 (4) | 407 |
| OMC 453 | 449 | FAM, 4 | 3.7 (1), 9.6 (4d), 9.7 (8) | — |
| OMC 455 | 449 | FAM, 6 | 5.8 (1), 9.6 (4), 9.7 (8) | 278 |
| OMC 457 | 449 | SC*, 1.9; PT, 7.5 | 7.0 (4), 9.8 (8) | <237 |

TABLE E-continued

Solidification of Na-5 Muds at 180° F.:
Na-5 Mud-Milpark's 14.3 lb/gal CarboDrill (Oil-to-Water Ratio 87:13)

| Slurry | Base Mix | Additive/ Concentration (lb/bbl) | Hardness/Curing Time (days) | BHN Compressive Strength (psi) |
|---|---|---|---|---|
| OMC 459 | 449 | SC, 1.9; FAM, 4 | 9.7 (4d) | <237 |

449 = Na-5 + 921 lb/bbl Class A cement + 335 lb/bbl water; solids-to-oil ratio = 1.8; water-to-cement = 40%
*SC = SurfCote The base slurry OMC 449 contains 921 lb/bbl Class A cement and 335 lb/bbl water in order to maintain a solids-to-oil ratio of 1.8 and a water-to-cement ratio of 40 percent. This will result in a volume increase of 180 percent based on the original mud volume. It is quite clear that a considerable amount of cement is needed to absorb the large amount of oil present in the Na-5 (conventional) oil mud. Considerable amounts of extra water are also needed to provide sufficient water for the cement hydration.

The retarding effect of SurfCote was demonstrated in a series of experiments shown in Table F. Addition of SurfCote clearly reduces the slurry yield point (lb/100 ft$^2$), but it retards the setting. The retardation by Surf-Cote can be reversed by adding an accelerator such as Pozzutec 20. The OMCs treated with SurfCote did not set without adding Pozzutec 20. Table F clearly shows that the more SurfCote added, the more Pozzutec 20 is needed to offset the influence of its retardation.

TABLE F

Effects of Pozzutec 20 on Setting and Compressive Strength of an OMC Containing Varying Amounts of SurfCote

| SurfCote (lb/bbl) | Rheology YP | Compressive Strength, psi Pozzutec 20, lb/bbl | | | |
|---|---|---|---|---|---|
| | | 0 | 7.5 | 13.1 | 18.75 |
| 2.0 | 330 | ns* | 1107 | 1115 | 930 |
| 3.0 | 285 | ns | ns | 913 | 977 |
| 5.0 | 250 | ns | ns | ns | 1008 |
| 3.0/2.0** | 250 | ns | ns | ns | 1143 |

*ns = not set
**Added separately two different times

High Water Oil-Base Mud System

A 12-barrel batch of a 13.5 ppg Milpark's CarboDrill 11-HW mud (designated as Na-7 mud) was prepared. This is a "high water" content oil mud with an oil-to-water ratio of 50:50. The formulation of this mud is as follows:

| | |
|---|---|
| Water | 212 gallons |
| Diesel | 212 gallons |
| NaCl | 588 pounds |
| Carbo-Tec L | 11.2 gallons |
| Lime | 30 pounds |
| Carbo-Mul | 19.5 gallons |
| Barite | 3,800 pounds |
| SurfCote | 24 pounds |

The final mud properties and retort analysis on this mud were as follows:

| | |
|---|---|
| Plastic Viscosity, cp | 56 |
| Yield Point, lb/100 ft$^2$ | 37 |
| 10 sec/10 min Gels, lb/100 ft$^2$ | 13/15 |
| Electrical Stability, volt | 216 |
| Oil Volume Fraction | 0.39 |
| Water Volume Fraction | 0.39 |
| Solids Volume Fraction | 0.22 |

Both the oil mud cement use and the universal fluid concept were tested in a large scale test unit which allowed mixing, pumping, filtration, and setting by using field equipment in a realistically sized simulated borehole at elevated temperatures. The filtration section of the test unit had a five-inch casing centralized (100% standoff) in a 6½-inch borehole in a synthetic permeable core 15 feet long. Two tests, OMC-1 and OMC-2, were run using this test system. A 12-barrel (504 gallons) batch of the above-listed mud was prepared and stabilized by stirring and pumping with high shear within the mixing unit. Portions of this mud were used for the two tests. The test slurries were batch-mixed, using this stabilized mud, with a high shear mixer (RCM cement mixing unit) just prior to their displacement into and circulation through the test model using a triplex pump.

In both tests an oil mud-cement slurry was made using a total solids-to-oil volume ratio of 1.8 and a total water-to-cement weight ratio of 0.31 (563 pounds of Class C cement and 49.3 pounds of added water per barrel of mud).

In Test OMC-1 this oil mud-cement slurry was circulated across the clean, permeable section of the model for five minutes and was then left static for five hours to filter at 100 psi pressure differential and 150° F. The filtration was then stopped and the temperature raised to 200° F. for curing.

In Test OMC-2 a universal fluid was prepared from the same base mud but with no additional water and only half of the previously used 563 pounds of cement per barrel of mud. This universal fluid was circulated across a clean permeable section of another test model and was left to filter for 18 hours at 150 psi and 150° F. Another portion of the base mud was then converted into the final oil mud-cement slurry by adding the same amounts of cement, water, and accelerators contained in the OMC-1 test. In field usage the universal fluid would have been the drilling mud and the addition of cement would have been only the differences of the components of the universal fluid and the final OMC slurry. This OMC slurry was used to displace the universal fluid from the model and to circulate across the universal fluid filter cake for several minutes. It was then left to filter at 150 psi and 150° F., forming an oil mud-cement cake on top of the universal filter cake. After the filtration it was left to cure at 250° F.

This part of the testing demonstrated that both the universal fluid and the oil mud cement slurries could be mixed, pumped, and set using field-type equipment without major operational problems.

Displacement Test Results

The traditional percent "displacement efficiency" is not applicable in these tests because no normal drilling mud filter cake was formed. Building and incorporating a settable universal fluid filter cake was the major goal for the OMC-2 test.

Slurry samples collected during the displacement tests were poured in 2-inch cube molds and small shear bond molds (1.5-inch diameter by 7 inches long) and cured in a water bath at 200° F. As shown in Table G, both OMC-1 and OMC-2 were demonstrated to gain adequate compressive strengths and excellent shear bonds.

TABLE G

Compressive Strengths and Shear Bonds on OMC-1 and OMC-2 Samples Aged at 200° F.

| Test | Average Compressive Strength (psi) (crushed) | Average Shear Bond (psi) (shear bond mold) |
|---|---|---|
| OMC-1 | 895 (8 days) | Not measured |
| OMC-2 | 960 (7 days) | 258 (7 days) |

A slurry sample collected during the OMC-2 test was run on an ultrasonic cement analyzer (UCA). Although the ultrasonic cement analyzer indicated a strength of 534 psi, its core recovered after the ultrasonic cement analyzer test was crushed, giving a compressive strength of 1108 psi.

Compressive strength data were obtained as checks of the effects of time and temperature on the oil mud-cement slurry and the heat aging samples. A one lab-barrel (350 ml) sample of the large test batch of the base mud was made into an oil mud-cement using the same composition as used in the displacement tests. Small vial samples of this oil mud-cement were then heat aged at 180° F., 200° F., and 210° F., leaving the main portion at room temperature. These three samples showed increased compressive strength with increased aging temperature (1104, 1304, and 1385 psi, respectively, all at 2.8 days curing time).

After three days the main sample was stirred with a Hamilton Beach mixer and another vial sample taken for heat aging. After 10 days another stirred sample was taken. After 11 days a non-stirred sample and a stirred sample (OMC 701) was taken. All of these samples set hard at 180° F. giving an average Brinell compressive strength of 1218 psi.

After 17 days, however, two stirred samples were taken, neither of which set even after 29 days at 180° F.

In some cases this time related non-setting phenomenon has been reversed by a strong mechanical shearing. In some other cases, the setting by the addition of more accelerator combined with the strong mechanical shearing has been required to initiate the test.

Zonal Isolation Tests

Each of the two test models with the solidified oil mud-cements supporting the 5-inch casing in the permeable 6½-inch simulated borehole was cut horizontally (perpendicular to its 15-foot axis) 80 inches from the top. The lower sections (from the 80- to the 180-inch levels) were used for the hydraulic bond tests. The entire length of the model was used for the shear bond tests.

For the hydraulic bond tests, five sets of two holes each (on opposite sides of the model) were drilled at the 90-, 110-, 130-, 150-, and 180-inch levels of the bottom 100-inch-long section, each set of holes being perpendicular to the adjacent ones. One hole at each level, spiraling down around the model at 90° increments, was drilled through the 10¾-inch outside casing and almost through the permeable, synthetic formation lying just beneath. The second hole at each level was drilled through the outside casing, the permeable formation, the filter cake zone, and almost through the oil mud-cement layer (approaching but not reaching the internal casing).

Epoxy cement was then used to bond small pipe nipples, for use as pressure taps, all the way into the holes, sealing all the layers exposed by the drilling. After tile epoxy had hardened, a hole was drilled down the axis of each of the first set of nipples, through the remaining part of the permeable layer, and just into the filter cake layer, thus exposing the formation-filter cake junction. A hole was also drilled down the axis of each of the second set of nipples, through the remaining part of the oil mud-cement layer, and just into the inner casing surface, thus exposing the oil mud-cement casing junction.

The "hydraulic bond" at each of the formation-cake junctions and the oil mud-cement casing junctions was successively measured by injecting water through the pressure tap at a rate of four ml per minute until a pressure breakdown was noted. The maximum pressure at each tap was recorded as the hydraulic bond.

Following the hydraulic bond tests, the entire model was cut into 10-inch lengths (except for the 60–80-inch level section which was left 20 inches long). The shear bond tests were then run on each section on a hydraulic press by pressing first on the 5-inch casing to measure the oil mud-cement to pipe bond and then on the set oil mud-cement area to measure the oil mud-cement to formation bond.

As shown in Table H, both oil mud-cement systems were demonstrated to provide good bonding in the displacement models. The data on hydraulic and shear bonds indicate that the oil mud-cements can provide excellent zonal isolation in a borehole.

TABLE H

Average Hydraulic and Shear Bond Test Results on OMC-1 and OMC-2 Cores

| Test No. | Hydraulic Bond (psi) | | Shear Bond (psi) | |
|---|---|---|---|---|
| | Formation | Casing | Formation | Casing |
| OMC-1 | 180 | 569 | 45 | 66 |
| OMC-2 | 187 | 429 | 25 | 39 |
| Average | 184 | 500 | 35 | 53 |

Oil Base Universal Fluid

In the full-scale testing, the LC OMC (containing one-half the amount of tile cement needed for OMC-2 and 8.4 lb/bbl Pozzutec 20) was tested as an oil-base universal fluid. This fluid was circulated in the model and left pressurized static overnight to deposit a settable filter cake in the test model. This LC OMC fluid was displaced by circulating the full OMC-2 slurry in the model at the end of the static filtration period. The entire system was then left static and pressurized to cure at elevate temperatures.

The filter cake laid down by the LC OMC hardened well. As discussed previously, the set filter cake plays a critical role in providing zonal isolation was shown in Table H.

A 5-gallon sample of the oil-base universal fluid was taken from the test batch and used for monitoring long-term rheological stability. As shown in Table I, rheological properties, slurry density, and electrical stability of this slurry were very stable for nearly 50 days. It appears that this fluid would be sufficient for drilling operations, assuming normal mud engineering care.

TABLE I

Monitoring of Rheological Properties of the Oil-Base Universal Fluid

| Fann RPM Dial Reading | | | | | | Slurry Properties | | | | ES |
|---|---|---|---|---|---|---|---|---|---|---|
| 600 | 300 | 200 | 100 | 6 | 3 | PV (cp) | YP (lb/100 ft$^2$) | Gels | MW (lb/gal) | (volt) |
| 180 | 60 | 43 | 26 | 4 | 3 | 48 | 12 | 4 | 17.4 | 252 |
| 114 | 65 | 47 | 27 | 4 | 3 | 49 | 16 | 4 | 17.4 | 249 |
| 104 | 59 | 43 | 25 | 4 | 3 | 45 | 14 | 4 | 17.4 | 235 |
| 116 | 60 | 43 | 25 | 4 | 3 | 56 | 4 | 3 | 17.4 | — |
| 102 | 59 | 43 | 25 | 4 | 3 | 53 | 16 | 3 | 17.4 | 254 |
| 105 | 60 | 44 | 25 | 4 | 3 | 54 | 15 | 3 | 17.4 | 278 |
| 106 | 62 | 45 | 26 | 5 | 3 | 44 | 18 | 3 | 17.4 | 281 |
| 107 | 62 | 45 | 26 | 5 | 3 | 45 | 17 | 3 | 17.4 | 283 |
| 108 | 62 | 44 | 26 | 5 | 4 | 46 | 16 | 4 | 17.4 | 308 |
| 117 | 68 | 50 | 29 | 5 | 4 | 49 | 19 | 4 | 17.4 | 287 |
| 110 | 64 | 48 | 28 | 5 | 4 | 56 | 18 | 4 | 17.4 | 286 |
| 120 | 69 | 52 | 30 | 5 | 4 | 51 | 17 | 4 | 17.4 | 297 |
| 118 | 67 | 50 | 29 | 5 | 4 | 51 | 16 | 4 | 17.4 | 265 |
| 123 | 71 | 58 | 32 | 5 | 4 | 52 | 16 | 4 | 17.4 | 275 |
| 120 | 69 | 52 | 30 | 5 | 4 | 52 | 16 | 4 | 17.4 | 280 |
| 121 | 70 | 52 | 30 | 5 | 4 | 51 | 19 | 4 | 17.4 | 268 |

Notes:
MW = Slurry density
ES = Electrical stability
Rheology measured with 10x spring at 150° F.

What is claimed is:

1. A composition for use in drilling and cementing a well comprising the product of:
an oil mud admixed with sufficient blast furnace slag and water to form a slurry having a total solids-to-oil weight ratio of about 1.4 to 2.2 and a blast furnace slag weight ratio of about 0.15 to 0.60, to produce an oil-base universal fluid suitable for drilling a borehole and laying down a settable filter cake on the walls of said borehole; an effective amount of accelerator and/or retarder admixable with or contacting the filter cake, the accelerator and/or retarder being functional to cause the filter cake to harden and a salt selected from the group consisting of sodium chloride, potassium chloride, zinc chloride, sodium nitrate and ammonium sulfate.

2. The composition of claim 1 wherein the accelerator is selected from the group consisting of nitrate accelerators, sodium silicate, sodium fluoride, sodium silicofluoride, magnesium silicofluoride, zinc silicofluoride, organic acids, and alcohols.

3. The composition of claim 1 including an effective amount of dodecyl benzene amine sulfonate to function as a retarder.

4. The composition of claim 1 wherein the mud used to drill the well partially forms said slurry, thereby minimizing waste and reducing mud disposal requirements.

5. The composition of claim 1 wherein the water-to-blast furnace slag is about 0.30 to 0.35.

6. The composition of claim 1 wherein the slurry includes an effective amount of an emulsifier selected from the group consisting of a modified tall oil fatty acid and a tall oil polyamide.

7. The composition of claim 1 wherein the accelerator is selected from the group consisting of a mixture of formic acid, acetic acid, and methanol; magnesium silicofluoride; zinc silicofluoride; and dodecyl benzeneamine sulfonate.

* * * * *